(12) United States Patent
Zhou

(10) Patent No.: US 10,359,180 B2
(45) Date of Patent: Jul. 23, 2019

(54) WALL LAMP WITH EASY INSTALLING AND UNINSTALLING

(71) Applicant: DONGGUAN THAILIGHT SEMICONDUCTOR LIGHTING CO., LTD, Dongguan (CN)

(72) Inventor: Wenbo Zhou, Dongguan (CN)

(73) Assignee: DONGGUAN THAILIGHT SEMICONDUCTOR LIGHTING CO., LTD., Dongguan (CN)

( * ) Notice: Subject to any disclaimer, the term of this patent is extended or adjusted under 35 U.S.C. 154(b) by 41 days.

(21) Appl. No.: 15/680,243

(22) Filed: Aug. 18, 2017

(65) Prior Publication Data

US 2018/0051866 A1 Feb. 22, 2018

(30) Foreign Application Priority Data

Aug. 18, 2016 (CN) ..................... 2016 2 0907337 U

(51) Int. Cl.
| | |
|---|---|
| F21V 21/00 | (2006.01) |
| F21V 29/74 | (2015.01) |
| F21V 15/01 | (2006.01) |
| F21V 23/02 | (2006.01) |
| F21Y 115/10 | (2016.01) |

(52) U.S. Cl.
CPC .............. *F21V 21/00* (2013.01); *F21V 15/01* (2013.01); *F21V 23/02* (2013.01); *F21V 29/74* (2015.01); *F21Y 2115/10* (2016.08)

(58) Field of Classification Search
CPC .......... F21V 21/00; F21V 29/74; F21V 15/01; F21V 23/02

USPC .......................................................... 362/373
See application file for complete search history.

(56) References Cited

U.S. PATENT DOCUMENTS

| | | | | |
|---|---|---|---|---|
| 6,905,222 | B1* | 6/2005 | Russello | F21S 8/033 362/147 |
| 8,770,778 | B2* | 7/2014 | Pereira | E06C 7/14 362/127 |
| 2008/0232081 | A1* | 9/2008 | Martinez | F21S 9/022 362/20 |
| 2012/0268952 | A1* | 10/2012 | Newton | B23P 11/00 362/368 |
| 2013/0329434 | A1* | 12/2013 | Packard | F21V 19/04 362/311.01 |
| 2014/0043835 | A1* | 2/2014 | Storm | F21S 8/06 362/404 |
| 2015/0260362 | A1* | 9/2015 | Koga | F21V 19/045 362/362 |

* cited by examiner

Primary Examiner — Laura K Tso

(57) ABSTRACT

The invention discloses a wall lamp with easy installation and uninstallation, which includes lamp beads, a lamp bead mounting frame, a mounting case and a power adapter. The mounting case includes a case body and a cover. The lamp bead mounting frame is a rectangular parallelepiped structure. The lamp beads are mounted on the outer surface of one side wall of the rectangular parallelepiped structure. The mounting case is mounted in the accommodating cavity of the lamp bead mounting frame. One side of the case cover is hinged on one side of the case body to form a hinge structure, and the other side of the case cover is separated from or fixedly connected to the other side of the case body. The invention provides a wall lamp with safe and easy installation and uninstallation.

6 Claims, 3 Drawing Sheets

WALL LAMP WITH EASY INSTALLING AND UNINSTALLING

CROSS REFERENCE TO RELATED APPLICATIONS

This application is based upon and claims priority to Chinese Patent Application No. 201620907337.5, filed on Aug. 18, 2016, the entire contents of which are incorporated herein by reference.

TECHNICAL FIELD

The invention relates to the field of illumination, particularly to a wall lamp which can be installed and uninstalled easily.

BACKGROUND

The installation and uninstallation of the current wall lamp, especially the street lamp, the mining lamp, the stage light, and etc., are extremely inconvenient. The general wall lamp is equipped with a power adapter. In order to protect the power adapter, the power adapter is usually installed in a closed space, in most cases, in the lamp cover. In that way, the installation and uninstallation of the wall lamp is very inconvenient. After the wall lamp is fixed to the wall, it needs to connect the power supply. The old installation method is to connect the power supply first, and then fix the wall lamp to the wall. This method is extremely inconvenient. The wall lamp may easily slip down during the installation which may cause damage. Further, it is hard to confirm whether the connected power supply wire falls off after the wall lamp slips down. This may causes security risks. Therefore, there is a demand for a wall lamp that is safe and easy to install and uninstall.

SUMMARY OF THE INVENTION

In order to overcome the deficiency of the prior art, the object of the invention is to provide a wall lamp which is safe and easy to install and uninstall by providing a case body and a case cover that is hinged to the case body. Firstly, the case cover is fixedly mount to the installation point, and then the case body is snapped on the case cover to complete the wall lamp installation.

The object of the invention is realized by the following technical solution.

A wall lamp that with easy installation and uninstallation, comprises a lamp bead, a lamp bead mounting frame, a mounting case, and a power adapter. The mounting case includes a case body and a case cover. The power adapter is mounted in the mounting case. The lamp bead mounting frame has a rectangular parallelepiped structure, and an accommodating cavity is provided within the rectangular parallelepiped structure. The lamp bead is mounted on an outer surface of a side wall of the rectangular parallelepiped structure. The mounting case is mounted in the accommodating chamber of the lamp bead mounting frame. One side of the case cover is hinged to one side of the case body to form a hinge structure, and the other side of the case cover is separated from or fixedly connected to the other side of the case body. The first case cover side of the case cover is hinged to either the first case body side of the case body or the second case body side of the case body, wherein either the first case body side of the case body or the second case body side of the case body to form a hinge structure, and the second case cover side of the case cover is separated from the first case body side of the case body if the first case cover side of the case cover is hinged to the second case body side of the case body, or the second case cover side of the case cover is separated from the second case body side if the first case cover side of the case cover is hinged to the first case body side of the case body so that the mounting case is open and the first case cover side of the case cover or the second case cover side of the case cover is fixedly connected to the first case body side of the case body or the second case body side of the case body so that the mounting case is closed to form a closed cavity structure.

Preferably, the lamp bead is an LED bead. LED lamp beads only generate little heat and save electricity.

Preferably, a cooling fin is provided on an inner side of the lamp bead mounting frame. The provided cooling fin is beneficial to dissipate the heat generated from the lamp beads so as to prevent the high temperature from damaging the lamp bead and wall lamp.

Preferably, the cooling fin is integrated with the lamp bead mounting frame. The integrated structure of the cooling fin and lamp bead mounting frame can enhance the heat dissipation effect and strengthen the resistance to the deformation of the device.

Preferably, a plurality of mounting holes for installation of the wall lamp are provided on the case cover.

Preferably, the outer surface of the side wall of the rectangular parallelepiped structure is recessed toward the interior of the rectangular parallelepiped structure to form a rectangular groove, and the lamp bead is mounted in the rectangular groove. This setting can prevent the rain from directly attaching to the lamp beads. The setting also prevents adverse effect on lighting. Furthermore, the setting described above prevents lamp bead from breaking due to a falling object.

Compared with the prior art, the advantages of the invention are listed below.

1. The invention provides a wall lamp which is safe and easy to install and uninstall by providing a case body and a case cover hinged to the case body. The case cover is firstly fixedly mounted to the installation point, and then the case body is snapped onto the case cover to complete the wall lamp installation.

2. The invention provides cooling fins on the lamp bead mounting frame and uses the LED lamp beads which generate less heat so as to effectively avoid the increase of the wall lamp temperature and prolong the life span.

3. The invention uses integrally molded cooling fins and provides rectangular grooves formed by inwardly recessing the side surface of the case cover where the lamp beads are mounted, such that the rain, dust and other substances can be effectively prevented from attaching to the lamp beads and affecting the illumination. Furthermore, due to the structure used, lamp beads are protected from falling objects.

Figure 1:
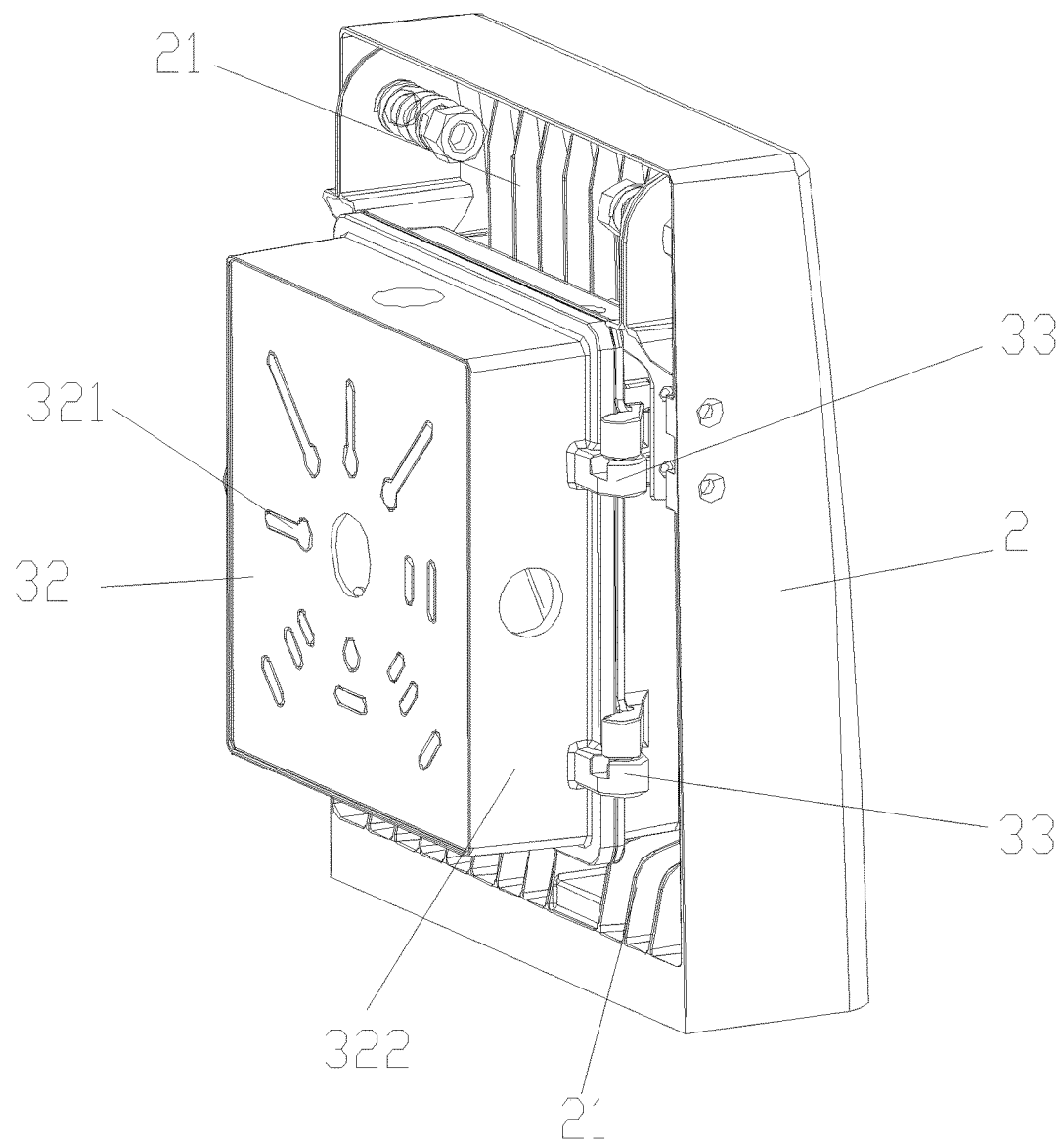
FIG. 1 is a schematic view of the new wall lamp structure of the invention.

In the drawings: 1. lamp bead; 2. lamp bead mounting frame; 21. cooling fin; 22. rectangular groove; 23. accommodating chamber; 3. mounting case; 31. case body; 311. first case body side; 312. second case body side; 32. case cover; 321. mounting hole; 322. first case cover side; 323. second case cover side; 33. hinged structure; 4. power adapter

DETAILED DESCRIPTION OF THE EMBODIMENTS

The invention will be further described with the drawings and the embodiments as below:

Embodiment 1

Figure 2:
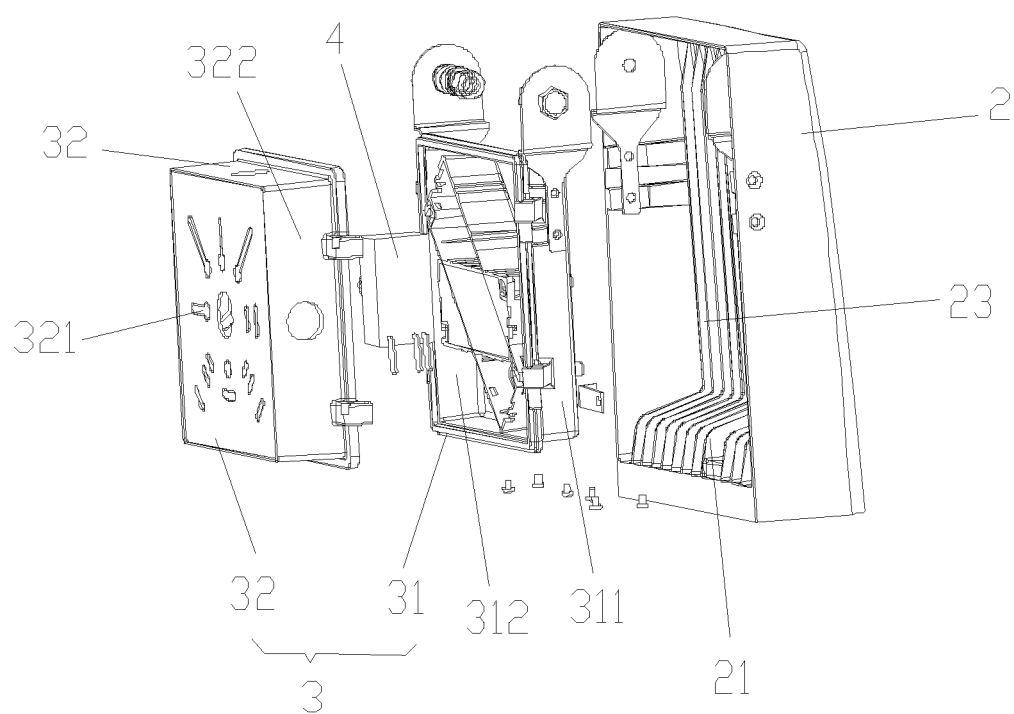
FIG. 2 is an explosive view of the new wall lamp of the invention.
Figure 3:
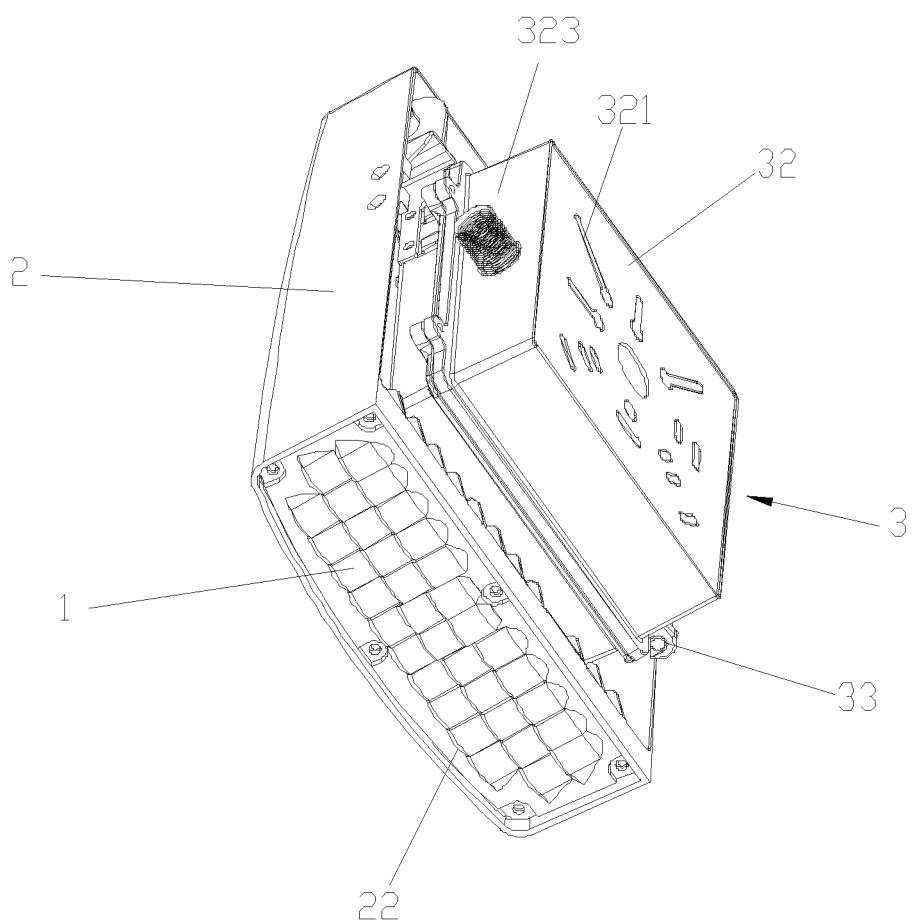
FIG. 3 is a schematic view of the new wall lamp structure of the invention viewing in another angle.

As shown in FIGS. 1 to 3, a wall lamp, which is easy to install and uninstall, includes lamp beads 1, lamp bead mounting frame 2, mounting case 3, and power adapter 4. Mounting case 3 includes case body 31 and case cover 32. Power adapter 4 is mounted in mounting case 3. Lamp bead mounting frame 2 has a rectangular parallelepiped structure, in which an accommodating chamber 23 is provided. The rectangular parallelepiped structure has four side walls. Lamp beads 1 are mounted on the outer surface of one side wall the rectangular parallelepiped structure, and lamp beads 1 are LED lamp beads. LED lamp beads generate less heat and save electricity. Mounting case 3 is mounted in the accommodating chamber 23 of lamp bead mounting frame 2. A first case body side 311 of case body 31 is hinged to a first case cover side 322 of case cover 32 so that case cover 32 and case body 31 are formed into a hinged structure 33, and a second case body side 312 of case body 31 is separated from or fixedly connected to a second case cover side 323 of case cover 32, which enables the mounting case 3 to be opened or closed. When the mounting case 3 is closed, a closed cavity structure is formed. A plurality of mounting holes 321 are provided on case cover for installing the wall lamp. Cooling fins 21 are provided on the inner side of lamp beads mounting frame 2. The setting of cooling fins 21 is beneficial to dissipating the heat generated by lamp beads 1, so as to prevent lamp beads 1 and the wall lamp from being damaged by the high temperature. Cooling fins 21 are integrally molded with lamp beads mounting frame 2. The integrally formed structure of cooling fins 21 and lamp beads mounting frame 2 can enhance the heat dissipation effect and strengthen the resistance to the deformation of the device. The surface on the side where lamp beads 1 are located is recessed toward the interior of the rectangular parallelepiped structure to form a rectangular groove 22, wherein lamp beads 1 are mounted in the rectangular groove 22. This arrangement can effectively prevent the rain, dust and other substances from attaching to lamp beads 1 and affecting the illumination and can avoid falling things from damaging lamp beads 1.

During the installation of the wall lamp, case body 31 and case cover 32 are opened. Then case cover 32 is attached to the installation point and the wall lamp is mounted to the wall lamp through mounting hole 321. After the connection and inspection for the wiring of the wall lamp are completed, lamp bead mounting frame 2 is rotated toward case cover 32, so that case body 31 is closely engaged with case cover 32. Then the installation is completed by fixedly connecting case body 31 to case cover 32 by screws. The structure and the method of installation provide easy maintenance access. Furthermore, the structure and the installation method protect the lamp from getting damaged from falling objects during installation, uninstallation or maintenance.

It will be apparent to the ordinary person skilled in the art that various other changes and modifications can be made based on the technical solutions and concepts described above, and that all such changes and modifications are within the scope of the present invention as defined by the claims.

What is claimed is:

1. A wall lamp, comprising:
   a lamp bead;
   a lamp bead mounting frame in a rectangular parallelepiped structure having an accommodating chamber and four side walls;
   a mounting case mounted in the accommodating chamber of the lamp bead mounting frame; and
   a power adapter mounted in the mounting case;
   wherein
   the mounting case comprises a case body and a case cover, the case body comprises a first case body side and a second case body side, and the case cover comprises a first case cover side and a second case cover side;
   the lamp bead is mounted on an outer surface of one of the four side walls of the lamp bead mounting frame;
   the first case cover side of the case cover is hinged to either the first case body side of the case body or the second case body side of the case body to form a hinge structure, and the second case cover side of the case cover is separated from the second case body side of the case body or the first case body side of the case body, so that the mounting case is opened or closed; when the mounting case is closed, a closed cavity structure is formed.

2. The wall lamp that with easy installation and uninstallation according to claim 1, wherein the lamp bead is an LED bead.

3. The wall lamp that with easy installation and uninstallation according to claim 1, wherein a cooling fin is provided on an inner side of the lamp bead mounting frame.

4. The wall lamp that with easy installation and uninstallation according to claim 3, wherein the cooling fin is integrated with the lamp bead mounting frame.

5. The wall lamp that with easy installation and uninstallation according to claim 1, wherein a plurality of mounting holes for installation of the wall lamp are provided on the case cover.

6. The wall lamp that with easy installation and uninstallation according to claim 1, wherein the outer surface of one of four side walls of the lamp bead mounting frame is recessed toward an interior of the lamp bead mounting frame to form a rectangular groove, and the lamp bead is mounted in the rectangular groove.

* * * * *